No. 614,890. Patented Nov. 29, 1898.
D. REYNOLDS.
APPARATUS FOR PURIFYING LIQUIDS.
(Application filed Apr. 3, 1897.)

(No Model.) 2 Sheets—Sheet 1.

Witnesses:
F. G. Desson
Alfred A. Mathey

Inventor
Dexter Reynolds,
By H. M. Plaisted,
his Atty.

No. 614,890. Patented Nov. 29, 1898.
D. REYNOLDS.
APPARATUS FOR PURIFYING LIQUIDS.
(Application filed Apr. 3, 1897.)
(No Model.) 2 Sheets—Sheet 2.
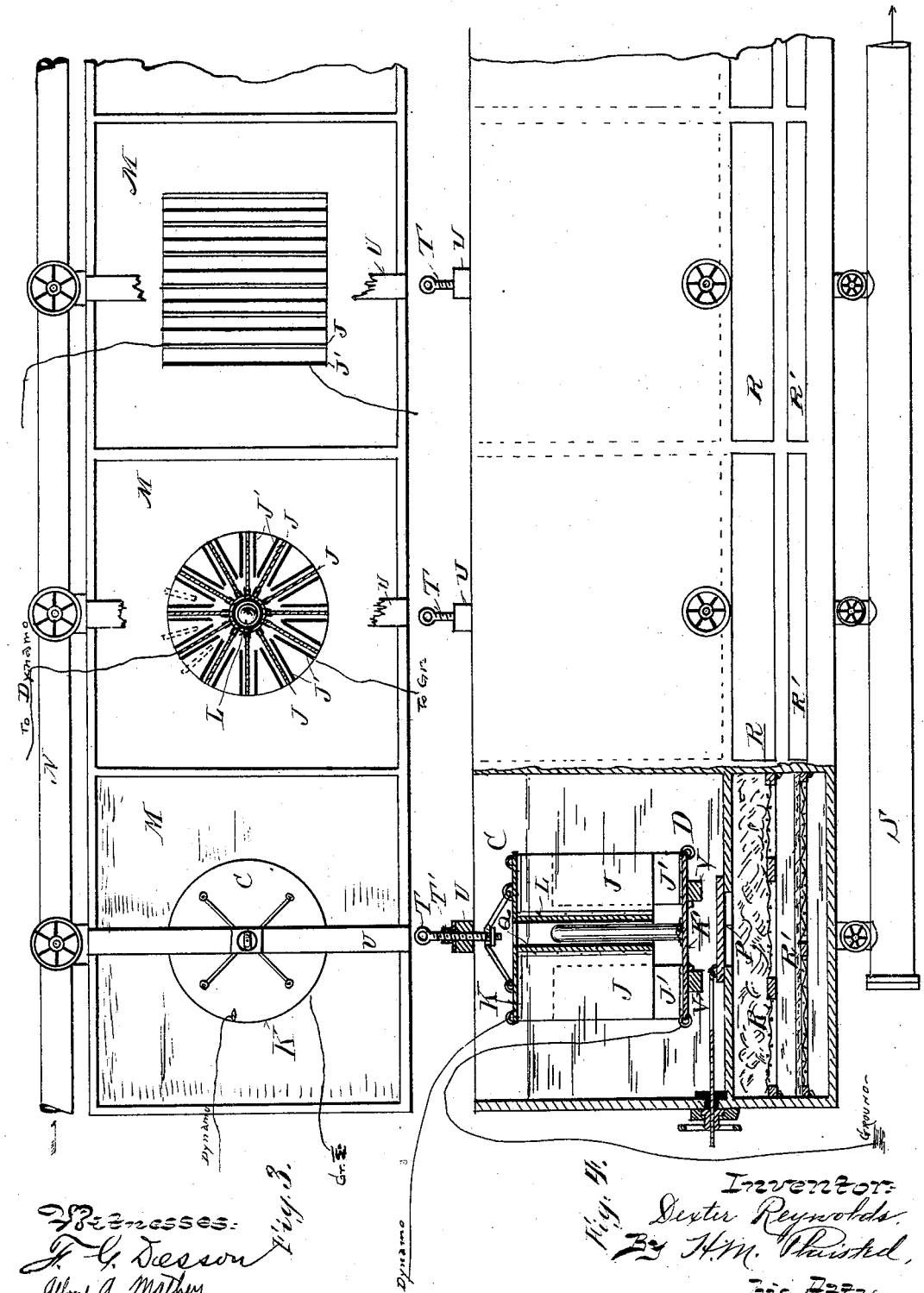

UNITED STATES PATENT OFFICE.

DEXTER REYNOLDS, OF ST. LOUIS, MISSOURI.

APPARATUS FOR PURIFYING LIQUIDS.

SPECIFICATION forming part of Letters Patent No. 614,890, dated November 29, 1898.

Application filed April 3, 1897. Serial No. 630,593. (No model.)

*To all whom it may concern:*

Be it known that I, DEXTER REYNOLDS, a citizen of the United States, residing at St. Louis, State of Missouri, have invented certain new and useful Improvements in Apparatus for Purifying Liquids, of which the following is a specification, reference being had therein to the accompanying drawings.

Figure 1:
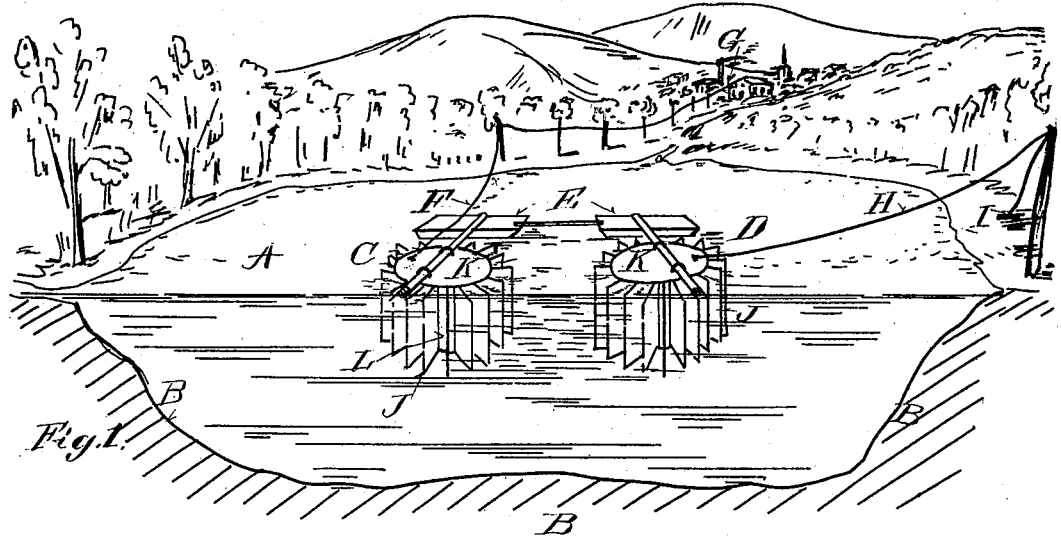
Figure 2:
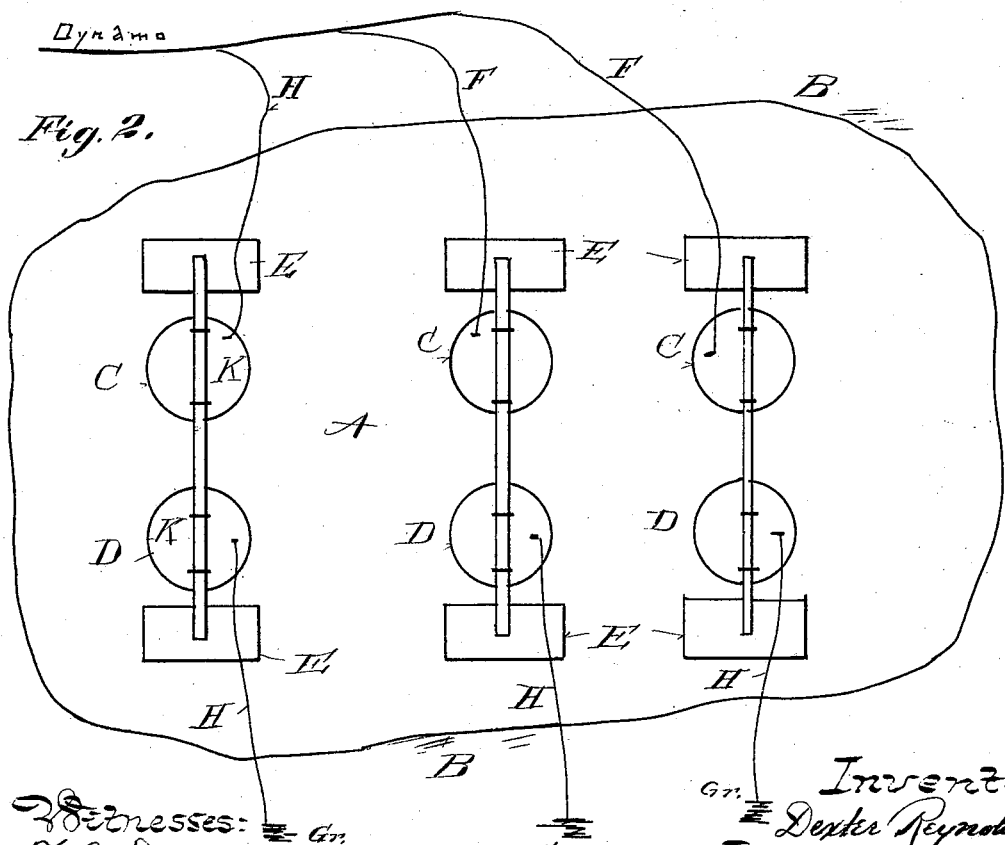

This invention relates to certain new and useful improvements in the apparatus for purifying liquids, especially water and milk, and the improvement of wine, whisky, and other spirituous liquors, the peculiarities of which will be hereinafter fully described and claimed:

In the accompanying drawings, on which like reference-letters indicate corresponding parts, Figure 1 represents a perspective view of a large body of water, such as a pond or reservoir, and my system of purification applied thereto; Fig. 2, a plan view of a large body of water, showing a bank or series of electrodes; Fig. 3, a plan view of a compartment-tank for the purification of liquid by my system; Fig. 4, a side and partial elevation showing the construction of said tank.

In the process of purifying water by electricity previously employed it was thought to be absolutely necessary that the water or other liquid acted on should be inclosed in an insulated vessel or tank to prevent the loss of electricity by discharging through the bottom and sides of the vessel instead of through the second electrode or cathode and thence back to the dynamo or source of electricity. Such insulation of large bodies of water naturally located, such as in ponds, is practically impossible, and hence the purification by electrical means of ponds and natural reservoirs has been found impracticable heretofore. By my experiments and the practical operation of my system I have discovered that such large bodies of water naturally located can be successfully purified without lining the banks and bottom of the pond with insulating material. I provide one or more pairs of electrodes so located that the members of each pair are closer together than they are to the bottom or sides of the pond or to any other conductor of electricity, one electrode, the anode, being connected with the dynamo or other source of electricity grounded on the cathode side, and the other, or cathode, being provided with a ground connection, which provides a better exit for the electrical current than the bottom and sides of the reservoir.

The letter A designates a pond or natural reservoir of water located within the sides and bottom B.

C and D represent a pair of electrodes supported by hooks adjustably mounted on bars or supports resting on floats E or otherwise. The anode is connected by the wire F to the dynamo or other source of electricity G, grounded on the cathode side, while the cathode D has a wire H grounded thoroughly at I or other suitable spot. The cathode D is located nearer to the anode C than the bottom or the sides of the pond, so that the resistance of the water between the electrodes is less than from the anode to any other point of discharge for the electric current. The electricity sent into the anode will therefore traverse the water in the pond, and the current seeking a path of least resistance will pass from C to D and thence through the ground connection H rather than traverse the greater distance to the sides and the bottom of the pond—that is to say, the main discharge of the anode C will take place through the interposed liquid to the cathode D, provided with its ground connection.

The action of the electricity upon water coagulates the impurities dissolved in the water, and the suspended impurities are inclosed by the coagulations, which in a short time, depending upon the quantity of the water acted upon and the power of the current, settle to the bottom of the pond.

In order to hasten the purification of a large pond, I provide two or more pairs of electrodes, each pair consisting of anode and cathode and supplied with an electrical current and a grounded connection, as above described, and the members of each pair separated in the liquid by a distance less than the distance from the anode to the bottom or bank of the pond.

The electrodes that I preferably employ consist of radially-mounted vertical plates J, connected to the disk K, and a central core L, whereby a large amount of surface is presented in a comparatively small compass.

In Fig. 1 the construction of the electrodes may be similar, but where I have applied my system of purification to small bodies of water I prefer to construct one of the electrodes so that it will telescope within the other.

In Figs. 3 and 4 I have shown my preferred construction in connection with a tank divided into compartments M, supplied through the water-main N and having exit by a valve-closed opening P at the bottom of each compartment. The cathode, for instance, is composed of the base-plate K′, supported by cross-timbers V away from the bottom of the tank, and vertical plates J′, extending upward from the base-plate between and parallel to the plates J of the anode. Angle-irons and bolts secure their edges, as shown.

In Fig. 3 a cross-section of the telescoped electrodes is shown in the second compartment. The core of the anode is hollow, and a matching center piece from the base-plate of the cathode enters the core and secures the proper location of the plates J and J′ as to each other. Interposed insulation Q avoids an electrical contact of the core and core-piece.

The same principle described in the location of the electrodes in the pond is carried out in the compartment-tank—that is, the space between the plates J and J′ is less than the distance from the anode to the sides of the tank, and the cathode is supplied with a ground-wire, giving a freer exit to the current than the sides and bottom of the tank, thus securing strong action through the water between the plates J and J′, while also traversing the water in the compartment. The coagulated impurities and suspended particles enmeshed therein will gradually sink to the bottom of the compartment, as in the pond; but to hasten the filtering process I provide a mechanical filtration to succeed the chemical action of the electrical current.

Beneath each compartment is a removable drawer filled with sponges or other suitable filtering material of fibrous or other material adapted to allow the rapid percolation of the liquid, which will retain the coagulated matter when the valve P is opened and the water flows into the lower chamber. The drawer R has a perforated or screen bottom, through which the water passes freed from its coagulated impurities. A lower drawer R′, provided with a layer of felt or other suitable material, will retain the small particles that may escape the first sponges. The purified water then passes into the main S and is pumped or otherwise delivered to the point of consumption. A continuous supply of purified water may thus be kept up, as one compartment may be shut off and cleaned without disturbing the operation of the other tanks.

One of the advantages of the radial arrangement of the plates is that the surface of the electrode can be increased by placing additional plates, as indicated by dotted lines in the sectional view, Fig. 3. This increase of surface may be desired in treating other liquids of greater density or impurity than water, and the additional surface is secured without corresponding increase of compass of the electrode.

It will be observed that while the plates of one electrode are shown radial the plates of the other electrode telescoped therewith are set in planes parallel to central planes and are thus only substantially radial. This parallel arrangement of plates may be secured by other construction, as shown in the third compartment of Fig. 3, in which the matching plates are shown by the alternately light and dark portions, (designated J J′;) but the radial arrangement before described is preferred.

The upper electrode is preferably the anode, and is supported by a set of rods meeting at the center, where a screw-threaded eyebolt T passes through a plate T′ and traverses the timber U to allow of adjusting the suspended electrode. When desired to separate them for cleaning or inspection, the upper electrode is removed by a fall and tackle.

While I have described my process as applied to the purification of water, yet it is adapted also to the purification and sterilization of milk, wines, and other liquids.

The chemical analysis of various tests of water purified by my process shows the impurities before contained had been removed and that the water was chemically pure; also, that milk was sterilized by my process so as to keep for a number of days in hot weather without souring and that the effect of treating wine and whisky by my process is to sterilize such liquids and age them. I therefore do not limit my process to the purification of water only.

While I may use any suitable metal for the electrodes herein described, yet I prefer to employ an alloy composed of zinc, iron, and aluminium combined in equal parts, using somewhat more than sufficient antimony to cause the thorough combination of the zinc, iron, and aluminium. This alloy possesses special advantages in the purification of water over the uses of other metals, such as copper, which are liable to contaminate the purified water when immersed therein.

I have made numerous practical tests in working up my apparatus and believe from the result of such tests and other sources that it is necessary to have two electrodes in order properly to get the transmission of current through the water. One electrode acts as a supply and the other as an exhaust, the ground electrode producing the effective action. The formation of the coagulated particles will be more thoroughly and quickly effected by the use of a strong current than with a weak current of electricity. By the use of the latter, however, I can purify the liquid, but it will take a longer time to effect the given result than when the strong current is used, since a weak current takes a longer time to do a given amount of chemical work.

In this application I have shown my system of tanks for the successive purification of quantities of water and the filtration of the coagulated and suspended impurities therein. I have, however, claimed such tank system and details in application filed July 6, 1897, Serial No. 643,645.

Having thus fully described my invention, what I claim as new, and desire to secure by Letters Patent, is—

1. In apparatus for treatment of liquids electrically, the combination with a non-insulated receptacle for the liquid to be treated, of one or more pairs of electrodes, supports for said electrodes by which one of each pair is movable with respect to the other, floats for said pair or pairs by which said electrodes are movably suspended in the liquid and may be variably located in such receptacle, a ground connection for the cathode electrode of each pair and a generator of electricity grounded on the cathode side and connected to the anode of each pair of electrodes, whereby said electrodes may be adjusted with respect to each other, and may be moved about in pairs to different locations within the liquid undergoing treatment, substantially as described.

2. In the purification of liquids, the herein-described electrodes, the same consisting of zinc, iron, aluminium, and antimony, substantially as and for the purpose described.

3. In the electrical purification of liquids, an apparatus comprising a pair of electrodes consisting of a set of radial plates mounted in the liquid to be purified, and a set of matching plates movably mounted in planes substantially parallel to the former plates, and electrical connections for said electrodes.

4. In the electrical purification of liquids, an apparatus comprising a pair of telescoping electrodes, one member consisting of a disk, a hollow core, and a set of plates radially mounted on said disk and core, the other member comprising a base-plate, a center core-piece, and a set of plates mounted on said base-plate and separated from said core-piece, an insulating material between said core-piece and hollow core respectively, and electrical connections for said electrodes substantially as described.

In testimony whereof I affix my signature in presence of two witnesses.

DEXTER REYNOLDS.

Witnesses:
H. M. PLAISTED,
ALFRED A. MATHEY.